United States Patent [19]
Endo

[11] 3,953,920
[45] May 4, 1976

[54] METHOD OF MAKING A TRANSDUCER
[75] Inventor: Teruyuki Endo, Alhambra, Calif.
[73] Assignee: International Telephone & Telegraph Corporation, New York, N.Y.
[22] Filed: May 14, 1975
[21] Appl. No.: 577,412

[52] U.S. Cl.................................. 29/592; 29/589; 29/610 SG; 338/2
[51] Int. Cl.² ........................................ H01S 4/00
[58] Field of Search ............ 29/584, 585, 590, 592, 29/595, 589, 610 SG; 65/59; 73/88.5 SD; 338/2, 5

[56]                  References Cited
              UNITED STATES PATENTS

| | | | |
|---|---|---|---|
| 3,397,278 | 8/1968 | Pomerantz.......................... | 29/589 X |
| 3,417,459 | 12/1968 | Pomerantz et al................. | 29/589 X |
| 3,713,068 | 1/1973 | Talmo................................... | 338/2 |
| 3,775,839 | 12/1973 | Talmo et al......................... | 29/610 X |
| 3,781,978 | 1/1974 | Intrator................................ | 29/589 |
| 3,803,706 | 4/1974 | Talmo................................... | 29/610 |
| 3,805,377 | 4/1974 | Talmo et al......................... | 29/610 SG |

*Primary Examiner*—Victor A. DiPalma
*Attorney, Agent, or Firm*—A. Donald Stolzy

[57]             ABSTRACT

A method of manufacturing a transducer having a leaf spring cantilever beam with a strain gauge bonded to each side thereof by a layer of glass. Either one or both strain gauges and one or both glass layers are bonded simultaneously. The assembly is heated and a voltage applied to complete all bonds without removing it from the oven. The simultaneous bonding without oven removal doubles or quadruples production and unexpectedly has the dual function of increasing yield by over one-third based upon matched gauge resistance and strength requirements.

7 Claims, 9 Drawing Figures

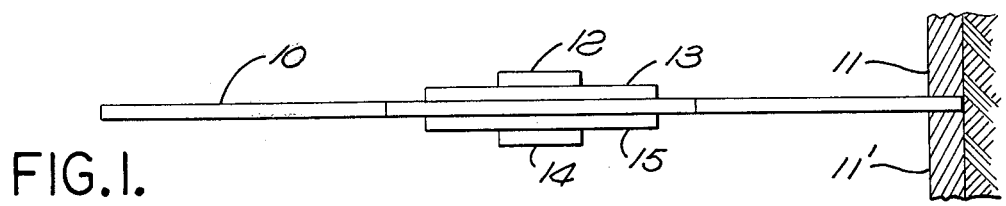
FIG.1.
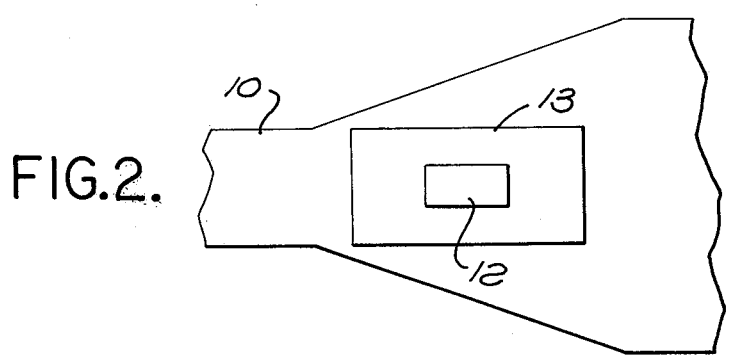
FIG.2.
FIG.3. PRIOR ART
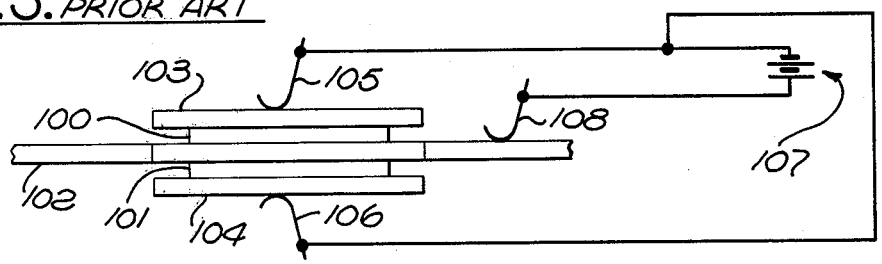
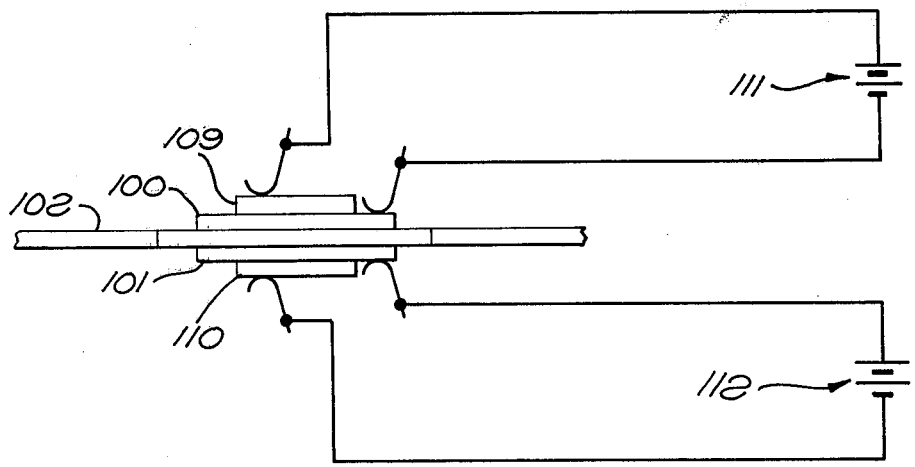
FIG.4. PRIOR ART

METHOD OF MAKING A TRANSDUCER

BACKGROUND OF THE INVENTION

This invention relates to the transducer fabrication art, and more particularly to a process of bonding strain gauges to opposite sides of a leaf spring cantilever beam for converting beam movement to an electrical signal via a Wheatstone bridge or otherwise in which the strain gauges are connected.

The present invention may be used in connection with many prior art arrangements, for example, as disclosed in all the patents cited herein including, but not limited to, U.S. Pat. Nos. 3,713,068 and 3,722,264.

In the past, due to breakage of glass bonds and because of deficiencies in a strain gauge resistance match, transducer yield has been a poor 65 percent or so. Some other prior art is disclosed herein. See also U.S. Pat. No. 3,713,068.

SUMMARY OF THE INVENTION

In accordance with the method of the present invention, the abovedescribed and other disadvantages of the prior art are overcome by performing a method that has the dual advantage of increasing production and increasing yield to, for example, 87 percent. This is done by making two or four glass bonds simultaneously in an oven without removing the assembly from the oven.

The above-described and other advantages of the present invention will be better understood from the following description when considered in connection with the accompanying drawings.

BRIEF DESCRIPTION OF THE DRAWINGS

In the drawings, which are to be regarded as merely illustrative:

FIG. 1 is a side elevational view of a transducer assembly;

FIG. 2 is a broken away bottom plan view of the transducer shown in FIG. 1;

FIG. 3 is a broken away side elevational view of a transducer subassembly under construction in accordance with a prior art method;

FIG. 4 is a broken away side elevational view of another transducer subassembly under construction in accordance with the said prior art method;

DESCRIPTION OF THE PREFERRED EMBODIMENT

Figure 5:
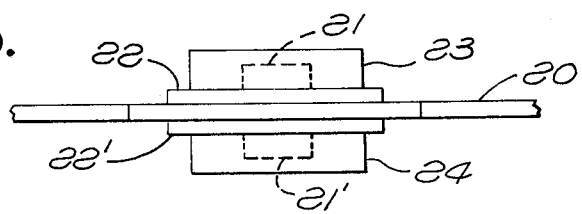
FIG. 5 is a broken away side elevational view of a transducer assembly under construction in accordance with the method of the present invention.
Figure 6:
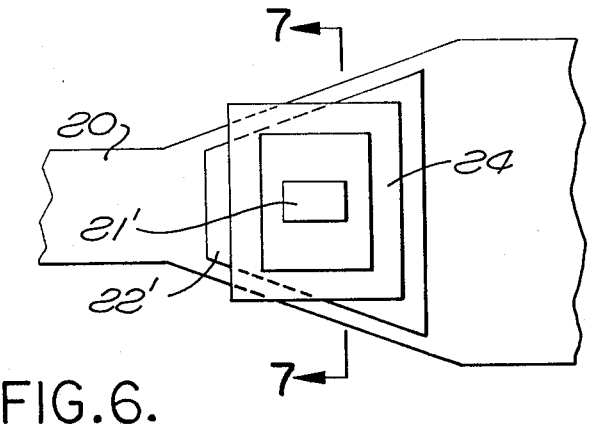
FIG. 6 is a bottom plan view of the subassembly shown in FIG. 5.
Figure 7:
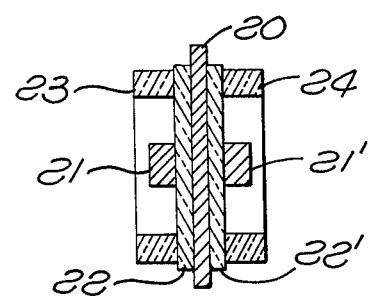
FIG. 7 is a transverse sectional view of the subassembly taken on the line 7—7 shown in FIG. 6.

In FIGS. 1 and 2, a cantilever beam 10 is shown having its right end fixed in supports 11 and 11'. A strain gauge 12 is bonded to beam 10 by a glass layer 13. A strain gauge 14 is bonded to the opposite side of beam 10 by a glass layer 15. Strain gauges 12 and 14 preferably are, but may not be identical. Glass layers 13 and 15 may be identical.

Although none of the materials, temperatures, and voltages set forth herein are critical, glass layers 13 and 15 are each preferably 0.001 inch thick.

Preferably, beam 10 is made of a nickel-steel alloy about 35 to 45 percent nickel, by weight. Preferably strain gauges 12 and 14 are made of monocrystalline silicon. Layers 13 and 15 are preferably made of Corning 7740 "Pyrex" glass.

In FIG. 3 a prior art arrangement includes glass layers 100 and 101 held on opposite sides of a beam 102 between auxiliary glasses 103 and 104, respectively, by spring electrodes 105 and 106, respectively.

A source of D.C. potential or battery 107 has its negative terminal connected to electrodes 105 and 106, and its positive terminal connected to a spring electrode 108 that bears in pressure and electrical contact with beam 102.

Battery 107 preferably supplies a difference of potential from 150 to 1000 volts. The difference of potential is applied while the temperature of beam 102, of layers 100, 101 and of glasses 103 and 104 is preferably maintained between 600° and 800° Fahrenheit.

The difference of potential is applied at least by the time that the parts have reached the temperature range of 600° to 800° Fahrenheit. When the difference of potential is applied, the current from battery 107 will rise to a peak value of about 5 microamperes. It will then decline exponentially with time to about 0.5 microamperes. It will generally take about five minutes for this decline. When the current has fallen after the peak to about 60 percent of the peak value, the bond between beam 102 and layers 100 and 101 will have been made so that these component parts may be cooled and battery 107 removed for further assembly.

As shown in the prior art arrangement of FIG. 4, strain gauges 109 and 110 are lightly pressed against layers 100 and 101, respectively. Batteries 111 and 112 maintain strain gauges 109 and 110 positive with respect to layers 100 and 101, respectively. From here on, the steps performed are exactly the same as those in bonding layers 100 and 101 to beam 102. That is, the temperature of the component parts 100, 101, 102, 109 and 110 is raised to between 600° and 800° Fahrenheit. When the current supplied by each battery 111 and 112 has peaked and reduced to sixty percent, the process is over and the parts may be allowed to cool and batteries 111 and 112 removed. The current peak in bonding glass and beam generally will be 10 to 15 microamperes (total from both batteries 111 and 112).

The process of obtaining a double bond (FIG. 3 or FIG. 4) will take about 20 minutes or more.

Some of the prior art where bonding of metals to glass is disclosed is as follows: U.S. Pat. Nos. 3,397,278 and 3,417,459. The prior art taught in these patents and all the others referred to herein may be used in the practice of the present invention, as applicable. For example, surface finish and flatness are important. The description thereof in the said patents may, therefore, be used to practice the present invention. Further, the glass should at least be thick enough to withstand voltage breakdown or arcing when the voltages of batteries 107, 111 and 112 are applied.

One embodiment of the method of the present invention is illustrated in FIGS. 5, 6, 7 and 8. In FIGS. 5–8, one mil thick glass layers 22 and 22' are located on opposite sides of a strain gauge beam 20, as yet not bonded thereto. Nine mil thick hollow auxiliary square glasses 23 and 24 are located on layers 22 and 22', respectively, with respective strain gauges 21 and 21'.

Glasses 23 and 24 are never bonded to anything, but serve as auxiliary structures to prevent voltage breakdown of layers 22 and 22', and to spread the electric field therethrough.

Figure 8:
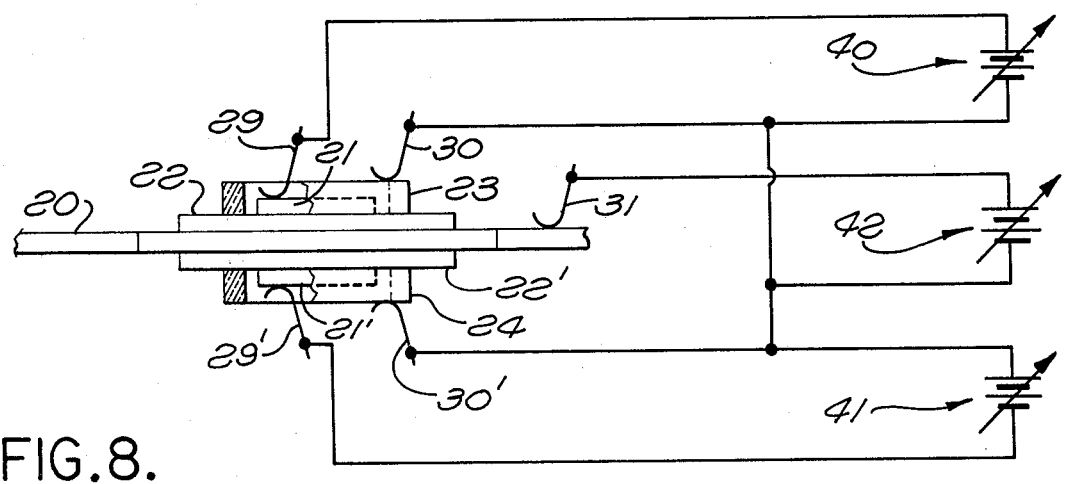
FIG. 8 is a broken away subassembly of a transducer under construction in accordance with the method of the present invention.

As will be described, simultaneously while the assembly of FIG. 8 is supported in an oven strain gauge 21 is bonded to layer 22, layers 22 and 22' are bonded to beam 20, and strain gauge 21' is bonded to layer 22' without removal of the assembly from the oven until all four bonds are made.

In FIG. 8 low force spring electrodes 29, 30, 29', 30' and 31 are connected from strain gauge 21, glass 23, strain gauge 21', glass 24, and beam 20, respectively.

Electrodes 29 and 30 are connected to the positive terminal of a battery 40.

Electrodes 29' and 30' are connected to the positive terminal of a battery 41.

Electrodes 30 and 30' are connected to the negative terminals of all three batteries 40, 41 and 42.

In accordance with the method of the present invention, all of the aforesaid simultaneous bonding is accomplished by varying the temperature of all the structures shown in FIG. 8 when located in an oven. The output voltages of all three batteries 40, 41 and 42 are also varied (all three are always the same) as follows in step numerical order.

| Step | Temperature Range — °C. | Voltage Range — Volts | State of Sources |
|---|---|---|---|
| 1 | Continuously varied 20 – 258 | 200 – 400 | * |
| 2 | 248 – 268 | 400 – 600 | * |
| 3 | 307 – 327 | 700 – 900 | * |
| 4 | 309 – 329 | 950 – 1000 | * |
| 5 | 314 – 334 | 0 | ** |
| 6 | 250 – 270 | 500 – 700 | ** |
| 7 | 290 – 310 | 950 – 1000 | ** |
| 8 | 318 – 338 | Air Cool (zero) | ** |

\* = Battery 40 or battery 41 or both connected, battery 42 disconnected.
\*\* = Battery 42 connected, batteries 40 and 41 disconnected.

Preferred temperatures and voltages follow:

| Step | Temperature — °C. | Voltage — Volts | State of Sources |
|---|---|---|---|
| 1 | Continuously varied 20 – 258 | 300 | * |
| 2 | 258 | 500 | * |
| 3 | 317 | 800 | * |
| 4 | 319 | 975 | * |
| 5 | 324 | 0 | ** |
| 6 | 260 | 600 | ** |
| 7 | 300 | 975 | ** |
| 8 | 328 | Air Cool (zero) | ** |

The preferred current ranges and (preferred values) for steps 3, 4 and 7 are as follows:

| Step | Current Range — μa. (Preferred Current) — μa. |
|---|---|
| 3 | 0.8 – 1.2 (1.0) |
| 4 | 1.6 – 2.4 (2.0) |
| 7 | 4.8 – 7.2 (6.0) |

Figure 9:
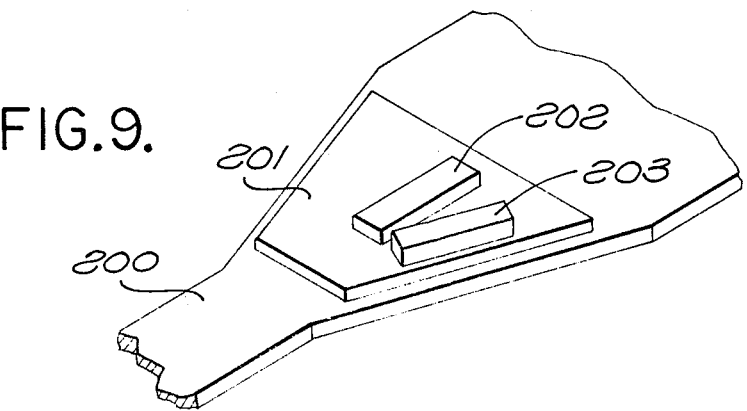
FIG. 9 is a broken away perspective view of an alternate subassembly of apparatus employed to practice the method of the present invention.

An alternative embodiment of the present invention is illustrated in FIG. 9, where a beam 200, a glass layer 201 and a strain gauge 202 may be identical to beam 20, layer 22 and strain gauge 21 in FIGS. 5–8. Only a new auxiliary glass 203 has been substituted for glass 23.

All or portions of the prior art disclosed in the following patents and the patents cited therein may be used in the preparation of and/or bonding of all or any one or more portions of the structures shown in FIG. 8:

| U.S. Pat. No. |
|---|
| 3,713,068 |
| 3,775,839 |
| 3,803,706 |
| 3,805,377 |

In accordance with the present invention the resistances of strain gauges 21 and 21' are almost identical after bonding. This insures accurate and matched strain gauge outputs required for superior transducer operation.

Typical strain gauge resistances are as follows:

|  | Minimum | Maximum |
|---|---|---|
| Before Bonding: | 480 ohms | 560 |
| After Bonding: | 430 ohms | 530 |

However, a pair of matched strain gauges will typically differ from zero to three ohms, or at least not greater than 30 ohms.

The bonds made in accordance with the present invention will remain intact when the beam 20 is flexed a great number of times.

What is claimed is:

1. The method of making a transducer, said method comprising the steps of: holding a layer of glass against a metal beam with a piece of auxiliary glass; holding a strain gauge against said layer; connecting the auxiliary glass to a first negative terminal of a first D.C. source of potential; connecting said strain gauge to the positive terminal on said first source; connecting one end of a loose first lead to said auxiliary glass; connecting one end of another loose second lead to said beam; heating an assembly including said layer of glass, said auxiliary glass, said strain gauge and said beam while the voltage of said first source is applied to the structures connected thereto until a bond is achieved between said strain gauge and said glass layer; disconnecting at least one of said first and second terminals; connecting said first and second leads to the third negative and fourth positive terminals of a second D.C. source of potential; and heating said assembly while said second source is connected as aforesaid until a bond is achieved between said layer and said beam, said assembly being kept in the self-same oven from the time said first heating step is performed until said layer is bonded to said beam.

2. The invention as defined in claim 1, wherein said assembly is kept in the self-same oven from the time that said first heating step is performed until said layers are bonded to said beam.

3. The invention as defined in claim 2, wherein the temperature in said oven and the voltages of said sources are varied in approximately the following successive steps:

| Step | Temperature Range — °C. | Voltage Range — Volts | State of Sources |
|---|---|---|---|
| 1 | Continuously varied 20 – 258 | 200 – 400 | * |
| 2 | 248 – 268 | 400 – 600 | * |
| 3 | 307 – 327 | 700 – 900 | * |
| 4 | 309 – 329 | 950 – 1000 | * |
| 5 | 314 – 334 | 0 | ** |
| 6 | 250 – 270 | 500 – 700 | ** |
| 7 | 290 – 310 | 950 – 1000 | ** |
| 8 | 318 – 338 | Air Cool (zero) | ** |

\* = First source connected, second source disconnected
\*\* = Second source connected, first source disconnected.

4. The invention as defined in claim 3, wherein said temperatures and voltages are varied approximately in the following successive steps:

| Step | Temperature — °C. | Voltage — Volts | State of Sources |
|---|---|---|---|
| 1 | Continuously varied 20 – 258 | 300 | * |
| 2 | 258 | 500 | * |
| 3 | 317 | 800 | * |
| 4 | 319 | 975 | * |
| 5 | 324 | 0 | ** |
| 6 | 260 | 600 | ** |
| 7 | 300 | 975 | ** |
| 8 | 328 | Air Cool (zero) | **. |

5. The method of making a transducer, said method comprising the steps of: holding first and second layers of glass against opposite sides of a metal beam with first and second pieces of auxiliary glass, respectively; holding first and second strain gauges against said first and second layers, respectively; connecting said first and second auxiliary glasses to each of the negative terminals of first and second D.C. sources of potential; connecting said first and second strain gauges to each of the positive terminals of said first and second sources, respectively; connecting one end of each of loose first and second leads to said first and second auxiliary glasses, respectively; connecting one end of each of third and fourth leads to said beam; heating an assembly including said layers, said auxiliary glasses, said strain gauges and said beam in an oven while the voltages of said first and second sources are applied to the structures connected thereto until a bond is achieved between said first and second strain gauges and said first and second layers, respectively; disconnecting at least one terminal of each of said first and second sources; connecting said first and second leads to the negative terminal of a third D.C. source of potential while said assembly remains in said oven; connecting said second and third leads to the positive terminal of said third source while said assembly remains in said oven; and heating said assembly while said third source is connected as aforesaid until a bond is achieved between said first and second layers and said beam, said assembly being kept in said oven from the time said first heating step is performed until said layers are bonded to said beam.

6. The invention as defined in claim 5, wherein the temperature in said oven and the voltages of said sources are varied in approximately the following successive steps:

| Step | Temperature Range — °C. | Voltage Range — Volts | State of Sources |
|---|---|---|---|
| 1 | Continuously varied 20 – 258 | 200 – 400 | * |
| 2 | 248 – 268 | 400 – 600 | * |
| 3 | 307 – 327 | 700 – 900 | * |
| 4 | 309 – 329 | 950 – 1000 | * |
| 5 | 314 – 334 | 0 | ** |
| 6 | 250 – 270 | 500 – 700 | ** |
| 7 | 290 – 310 | 950 – 1000 | ** |
| 8 | 318 – 338 | Air Cool (zero) | ** |

\* = First and second sources connected, third source disconnected
\*\* = Third source connected, first and second sources disconnected.

7. The invention as defined in claim 6, wherein said temperatures and voltages are varied approximately in the following successive steps:

| Step | Temperature — °C. | Voltage — Volts | State of Sources |
|---|---|---|---|
| 1 | Continuously varied 20 – 258 | 300 | * |
| 2 | 258 | 500 | * |
| 3 | 317 | 800 | * |
| 4 | 319 | 975 | * |
| 5 | 324 | 0 | ** |
| 6 | 260 | 600 | ** |
| 7 | 300 | 975 | ** |
| 8 | 328 | Air Cool (zero) | **. |

\* \* \* \* \*

UNITED STATES PATENT OFFICE
CERTIFICATE OF CORRECTION

PATENT NO. : 3,953,920
DATED : May 4, 1976
INVENTOR(S) : Teruyuki Endo

It is certified that error appears in the above-identified patent and that said Letters Patent are hereby corrected as shown below:

In Figs. 4 and 8, reverse the polarities of batteries 112 and 41, respectively.

Column 3, line 18, replace "terminal" with --and negative terminals, respectively,--. Column 3, line 20, replace "terminal" with --and negative terminals, respectively,--.

Signed and Sealed this

Second Day of November 1976

[SEAL]

Attest:

RUTH C. MASON
*Attesting Officer*

C. MARSHALL DANN
*Commissioner of Patents and Trademarks*